United States Patent Office 2,754,280
Patented July 10, 1956

2,754,280

EMULSIONS OF IONICALLY CROSS-LINKED RESINS AND METHODS FOR MAKING THEM

George L. Brown, Moorestown, N. J., and Benjamin B. Kine, Levittown, Pa., assignors to Rohm & Haas Company, Philadelphia, Pa., a corporation of Delaware No Drawing. Application April 23, 1954,
Serial No. 425,331

12 Claims. (Cl. 260—29.6)

This invention relates to the preparation and use of stable aqueous dispersions of dissociated ionically cross-linked water-insoluble resins. It relates to aqueous dispersions which are stable and which are particularly suited as vehicles for surface-coatings and for the production of dry, non-blocking free films or pellicles. It relates to dispersions in certain aqueous media of water-insoluble copolymers of (a) the lower alkyl esters of acrylic and methacrylic acids and (b) acrylic, methacrylic and/or itaconic acids, which copolymers are cross-linked by means of certain polyvalent metals as is described in greater detail below. This application is a continuation-in-part of our copending application Serial No. 336,632, filed February 12, 1953, now abandoned.

An object of this invention is to provide dispersions which, when deposited as thin layers or films and then dried, provide continuous films which are tough, dry, and non-blocking, and which are characterized by a lack of cold-flow. A further object is to provide surface-coating dispersions which, on evaporation in thin layers, yield films which are continuous and cohesive and have the properties usually associated with films of thermoset resins. That is to say, an object is to provide dispersions of resins which are actually cross-linked but which, despite their being cross-linked, coalesce during a drying period and form cohesive and continuous films. A further object is to coat materials by means of such dispersions and to prepare free films of resins from such dispersions.

These and other objects are most advantageously attained by emulsifying, with a non-ionic emulsifying and/or dispersing agent, and copolymerizing—preferably under the influence of a peroxidic free-radical catalyst—a mixture which contains at least one of each of these two kinds of polymerizable materials: (a) esters of acrylic and methacrylic acids and (b) acrylic acid, methacrylic acid, and itaconic acid, and then neutralizing at least some of the free carboxyl groups in the copolymer by means of certain oxides, hydroxides, or salts of a polyvalent metal. Less advantageously, water-insoluble copolymers of the aforesaid two types of polymerizable materials produced in any other way may be dispersed in water by means of non-ionic dispersing agents.

The resultant products are to all intents and purposes dispersions of cross-linked resins because pairs of carboxyl groups in the various molecular chains are joined together; i. e., are cross-linked, by the atoms of the polyvalent metals. As long as water is present, ionization occurs and the positive ions of the cross-linker and the negative ions of the resin have a certain degree of mobility so that the cross-linkages are not fixed or rigid. As a result, the resin particles in a film of the dispersion can and do coalesce as drying takes place. However, as the water is removed by evaporation or force-drying, the mobility of the ions is gradually reduced; and when substantially all of the water is removed, the ions become immobilized. Then the metals and the long chains of resin become chemically bound in a rigid, fixed, and cross-linked molecular configuration.

The dispersions of this invention are in reality those of dissociated ionically cross-linked resins and they are decidedly different from the dispersions of resins which are cross-linked by means of a polyvinyl compound such as divinyl-benzene. The latter kind of dispersions contains resins which are rigidly cross-linked even when they are dispersed in the aqueous phase and consequently on drying they deposit the resin in the form of discrete particles which do not effectively coalesce and which form weak or discontinuous films.

Furthermore, the dispersions of this invention give rise to films which are not subject to cold-flow and which do not block in contrast to dispersions of the same esters and acids which are not ionically cross-linked. Thus, the instant products have the advantages of both thermoplastic resin dispersions and thermoset resin dispersions without the chief disadvantages of either.

The dispersions are preferably prepared by emulsifying a mixture of (a) one or more monomeric esters of acrylic and/or methacrylic acid and (b) monomeric arcrylic, methacrylic and itaconic acid or mixtures of these acids in water and polymerizing the mixture while it is in the emulsified form. It is essential that a non-ionic emulsifying or dispersing agent be used. The monomeric esters of acrylic and methacrylic acids which have proven to be most satisfactory are the alkyl esters in which the alkyl group contains one to eight carbon atoms and which are exemplified by the following: methyl, ethyl, n-propyl, isopropyl, n-butyl, isobutyl, sec-butyl, tert-butyl, isoamyl, tert-amyl, hexyl, heptyl, n-octyl, and 2-ethylhexyl acrylates and methacrylates and isomers of these. From 0.25% to 25% on a molar basis—or preferably from 0.5% to 12%—of the acid is employed.

The non-ionic emulsifiers or dispersing agents that may be used for preparing the monomeric emulsions before copolymerization or dispersions of the polymer after polymerization include the following: alkylphenoxypolyethoxyethanols having alkyl groups of about seven to eighteen carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of six to fifteen carbon atoms; ethylene oxide derivatives of long-chained carboxylic acids, such as lauric, myristic, palmitic, oleic, and the like or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units, etc.; block copolymers of ethylene oxide and propylene oxide comprising a hydrophobic propylene oxide section combined with one or more hydrophilic ethylene oxide sections.

The dispersions can be prepared at temperatures from 0° C. to about 100° C., but intermediate temperatures are much preferred. Thus, with the esters in which the alkyl group contains one to four carbon atoms a temperature from about 10° C. to about 60° C. is employed whereas a higher temperature; e. g., 30° C. to 80° C., is recommended when those esters containing five to eight carbon atoms in the alkyl group are copolymerized. Peroxidic free-radical catalysts, particularly catalytic systems of the redox type, are recommended. Such systems, as is well known, are combinations of oxidizing agents and reducing agents such as a combination of potassium persulfate and sodium metabisulfite. Other suitable peroxidic agents include the "per-salts" such as the alkali metal and ammonium persulfates and perborates, hydrogen peroxide, organic hydroperoxides such as tert-butyl hydroperoxide and cumene hydroperoxide, and esters such as tert-butyl perbenzoate. Other reducing agents include water-soluble thiosulfates and hydrosulfites and the salts—such as the sulfates—of metals which are capable of existing in more than one valence state such as cobalt, iron, nickel, and copper. The most convenient method of preparing the copolymer dispersions comprises agitating an aqueous suspension of a mixture of copolymerizable monomers and a redox catalytic combination at room temperature without the application of external heat. The amount of catalyst can vary but for purposes of efficiency from 0.01% to 1.0%, based on the weight of the monomers, of the peroxidic agent and the same or lower proportions of the reducing agent are recommended. In this way it is possible to prepare dispersions which contain as little as 1% and as much as 60% of the resinous copolymer on a weight basis. It is, however, more practical—hence preferred—to produce dispersions which contain about 30%–50% resin-solids.

As indicated above, the instant products are dispersions of certain described esters and acids. It is also within the spirit and scope of this invention to substitute for some of the acrylic or methacrylic esters defined above another copolymerizable monoethylenically unsaturated compound such as one which contains a single vinylidene group,

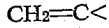

Such compounds include vinyl chloride, vinylidene chloride, styrene, vinyltoluene, vinylnaphthalene, higher alkyl esters of acrylic and methacrylic acids such as lauryl and octadecyl acrylates and methacrylates, and aryl esters such as benzyl and phenylethyl acrylates and methacrylates. Obviously, such copolymerized materials exert their own influence on the properties of the films which are obtained. Thus, copolymerized styrene makes for greater hardness while octadecyl acrylate makes for softness and flexibility. This invention, therefore, embraces ionically cross-linked copolymers which contain another copolymerized monoethylenically unsaturated compound and especially one having a vinylidene group,

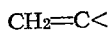

in addition to the acrylic or methacrylic ester and the acrylic, methacrylic or itaconic acid. In such products the amount of copolymerized acid should be 0.25–25 molar percent and the amount of ester should be greater on a molar basis than the amount of the third copolymerized compound.

Next, free carboxyl groups of the copolymer are neutralized; and this is done by adding a basic compound of a polyvalent metal which forms salts with the carboxyl groups of the copolymer. Oxides or hydroxides of barium, calcium, magnesium, and strontium have been employed for this purpose and all produced dispersions which deposited films of outstanding properties. Hydroxides of aluminum, lead and zirconium may also be used. It must also be pointed out that the basic salts of polyvalent metals and their salts of weak acids (which are in effect basic compounds when in the aqueous dispersions) have been used successfully, such as the normal and basic acetates of barium, calcium, cadmium, cerium, strontium, zirconium, lead, cobalt (ic and ous), chromium (ic and ous), copper (ic), zinc, magnesium, iron (ous), manganese (ous), mercury (ic), and nickel (ic and ous). Tartrates, citrates, and oxalates may be used, such as stannous tartrate and titanium oxalate. Basic aluminum acetate, basic aluminum formate and basic zirconyl acetate are especially valuable for ionically cross-linking the resins. What is required is that a sufficient number of carboxyl groups be converted into salt groups of the polyvalent cations so that, on removal of water, the cations link pairs of carboxyl groups together and thus insolubilize the resin. For this purpose it has been found that the acid groups of the copolymers must be converted to salt groups to such an extent that at least 0.25% and preferably 0.5% or more, on a molar basis, of all of the copolymerized units in the final copolymer are salt groups. Thus, substantially all of the carboxyl groups in a copolymer containing only 0.25 to 0.5 molar percent of copolymerized acid must be neutralized. In the case of a copolymer which contains a greater proportion of copolymerized acid; i. e., up to 25 molar percent, it is not necessary, although it is desirable, that all of the carboxyl groups be converted to salt groups. But it is always necessary that enough of them be converted to salt groups so as to provide the minimum number mentioned above.

The basic metallic compounds which are used to neutralize the carboxyl groups of the copolymers and thus convert them into salt groups are those of divalent and trivalent metals which have at least a solubility in water of 0.0006 grams per 100 cc. Actually, only two valences of the trivalent metals may be involved in the neutralization so that the compounds of trivalent metals may react, as far as this invention is concerned, as if they were compounds of divalent metals. Therefore, what is required is that the copolymer be reacted with and neutralized by at least 0.125 mole — and preferably from 0.25 mole to 12.5 moles — of the basic metallic compound for every hundred moles of copolymerized ester and acid. That is to say, the number of moles of basic metallic compound which are reacted with the copolymer are from 0.125 to 12.5 percent of the total number of moles of the ester and acid which are copolymerized. Any insoluble excess of metallic oxide, hydroxide, or basic salt which is employed over the amount which reacts with the copolymer can be readily separated from the copolymer dispersion by such means as filtration or decantation.

The highly soluble basic salts have the following advantages over the oxides and hydroxides of relatively low solubility. They are rapid in their cross-linking action. They are easily distributed uniformly through the resin dispersions in controlled amounts. They are easier to handle since they can be dissolved in aqueous solutions and it is unnecessary to grind to a dust as in the case of relatively insoluble material like the oxides and hydroxides. They involve on that account less of a health hazard. The highly soluble basic salts produce films and other masses of better transparency and other optical properties. They do not settle out of the dispersions during storage thereof. The oxides and hydroxides are prone to do this on standing and they frequently form cloudy, translucent films or the like instead of being clear and transparent. In addition, the basic salts are generally three to five times as efficient in cross-linking as the salts of weak acids. Accordingly, the basic salts are the preferred groups of cross-linking compounds.

In order to provide resinous surface-coatings or free films which on the one hand are cross-linked and are consequently water-insoluble and chemical-resistant and which on the other hand are continuous, strongly cohesive, and of high tensile strength, it is essential, first, that the cross-linked copolymer be in the form of a dispersion and, second, that the dispersed copolymer be in the form of dissociated ionically cross-linked salt of a polyvalent cation. Hence, this invention is not concerned with dispersions of copolymers which are organically cross-linked by polyvinyl organic compounds because such dispersions do not form cohesive films on mere air-drying at room temperatures. Furthermore, it is not at all concerned with organic solutions of linear polymers. Nor does this invention involve alkali metal salts or ammonium salts of copolymers, none of which is cross-linked and all of which are water-soluble or at least water-swellable. Such water-sensitive salts of copolymers have long been known and while they have certain merit and utility, they are not cross-linked and do not give rise to the kind of films or surface-coatings with which this invention is concerned.

When employed as surface-coatings, the dispersions of the present invention are readily applied by conventional means such as brushing, spraying, dipping, roller-coating, padding and the like. The films are then dried either by evaporation or by the application of heat. While heating of the coating is unnecessary, it does accelerate the cross-linking and in general enhances the adhesion of the films. Temperatures up to the boiling point of the aqueous phase of the dispersions can be used; and, since cross-linking takes place during the drying period, there is no particular reason for further heat-treating the dried films. Free films are also made readily by conventional methods as, for example, by casting, or by coating a drum followed by stripping of the film from the coated surface.

The following examples, in which all parts are by weight, serve to illustrate the preparation and properties of the products of this invention.

*Preparation of dispersed copolymers*

A. The following components were placed in a flask equipped with a mechanical stirrer and thermometer:

71.25 parts ethyl acrylate
217 parts water
6.43 parts non-ionic dispersing agent (a 70% aqueous solution of a tert-octylphenoxypolyethoxyethanol containing an average of about 35 oxyethylene units in the molecule)

The mixture was cooled to 15° C. and there were added 0.09 part of ammonium persulfate and 0.12 part of sodium hydrosulfite. The mixture was agitated; and the exothermic polymerization soon began, as evidenced by a rise in temperature. The addition of 3.75 parts of acrylic acid was at once begun and continued over a period of five minutes during which time the temperature rose about 10 degrees. The temperature rose rapidly thereafter and reached 60° C. in 10 minutes at which point an ice-bath was applied. The mixture was thereby cooled to 38° C. in 15 minutes at which point the ice-bath was removed and to the mixture was added 0.78 of tert-butyl hydroperoxide dissolved in 6 parts of water. The resultant mixture was further stirred for 30 minutes.

B. In a similar manner a dispersion of a copolymer of ethyl methacrylate and acrylic acid was made. The only departures from the procedure described in part A above were that ethyl methacrylate was substituted for the ethyl acrylate and ferrous sulfate was added at the beginning in such an amount as to provide 3 p. p. m. of ferrous ion based on the mixture of monomers.

C. In another instance, a mixture of 47.5 parts of ethyl acrylate, 3 parts of non-ionic dispersing agent, and 100 parts of water was cooled to 15° C. and then agitated. Then .085 part of ammonium persulfate and .08 part of sodium hydrosulfite were added. As soon as the temperature began to rise, 2.5 parts of itaconic acid, dissolved in 44 parts of water, was added over a period of 8 minutes. As polymerization proceeded, the temperature rose in 17 minutes to a maximum of 56° C. The dispersion was stirred until it reached room temperature.

D. An emulsion of butyl acrylate and acrylic acid was made by the method described in part A above for the copolymerization of ethyl acrylate and acrylic acid except that an ice-bath was applied when the temperature reached 50° C.

When higher alkyl esters; e. g., 2-ethylhexyl acrylate, are employed, it is recommended that somewhat higher temperatures, of the order of 70°–80° C., be used. And under such conditions it is further recommended that the reactor be equipped with a reflux condenser.

E. Dispersions of copolymers containing two or more esters of acrylic and/or methacrylic acid are made in a similar way. Thus, the procedure of part A above was followed with the exception that 71.25 parts of a mixture of 6 moles of ethyl acrylate and 4 moles of methyl methacrylate was used in place of the single ester, ethyl acrylate, of part A.

*Preparation of ionically cross-linked copolymers*

All of the dispersions which were prepared as above-described were divided into portions and the individual portions were treated at room temperature with the following basic compounds in such amounts as were equivalent to twice the number of moles of copolymerized acid present: $Al(OH)_3$, $Al(OOCCH_3)_2OH$, $Al(OOCCH_3)_2(OOCH)$, $Ba(OH)_2$, $Ca(OH)_2$, $MgO$, $Sr(OH)_2$, $Mg(OOCCH_3)_2$, $Mg(OH)_2$, $Pb(OOCCH_3)_2$, $ZrO(OOCH)_2$. After two hours the dispersions were filtered and samples of each were flowed on glass and the films were allowed to dry. In all cases the dried films were tack-free and were free of cold-flow. Also, all of the films were insoluble in toluene, although they imbibed the solvent and swelled somewhat.

In contrast with the above, portions of the dispersion which were not treated with the polyvalent metallic cross-linking agents (blanks) formed films which blocked, had cold-flow, and were completely soluble in toluene.

The dispersions of this invention are especially useful for the deposition of flexible surface-coatings which are clear or which can be opacified and/or colored by the incorporation of dyes or pigments. The dispersions have been employed in the coating of rigid materials such as wood and metals. Also, various kinds of paper, such as wrapping paper and wallpaper, have been coated and thus protected and decorated. The feel and body of fabrics have been much improved by impregnation with these dispersions. Coatings for leather made from the dispersions were characterized by excellent appearance and very desirable flexibility at low temperatures. The free films which are flexible and strong and which are resistant to water and chemicals find a ready use as wrappers for oily, greasy, or corrosive articles.

We claim:

1. As a new composition of matter, an aqueous medium comprising dispersed therein (1) a non-ionic emulsifier, (2) a water-insoluble copolymer containing, in the polymer molecule, units of at least one ester of an acid selected from the group consisting of acrylic and methacrylic acids and 0.25 to 25 molar percent of carboxyl-containing monomeric units derived from at least one member of the class consisting of acrylic, methacrylic, and itaconic acids, and (3) a basic metallic compound, in an amount from 0.125 to 12.5 molar percent based on the weight of the copolymer, selected from the class consisting of polyvalent metal salts of weak acids, basic salts of polyvalent metals, the oxides and hydroxides of barium, calcium, magnesium, and strontium, and the hydroxides of aluminum, lead, and zirconium.

2. As a new composition of matter, an aqueous medium containing dispersed therein (1) a non-ionic emulsifier, (2) a copolymer containing, in the polymer molecule, 75 to 99.75 molar percent of monomeric units derived from at least one member of the class consisting of the alkyl esters of acrylic and methacrylic acids in which the alkyl group of the ester contains one to eight carbon atoms and 0.25 to 25 molar percent of carboxyl-containing monomeric units derived from at least one member of the class consisting of acrylic, methacrylic, and itaconic acids, and (3) a basic metallic compound, in an amount from 0.125 to 12.5 molar percent based on the weight of the copolymer, selected from the class consisting of polyvalent metal salts of weak acids, basic salts of polyvalent metals, the oxides and hydroxides of barium, calcium, magnesium, and strontium, and the hydroxides of aluminum, lead, and zirconium.

3. As a new composition of matter, an aqueous medium comprising dispersed therein (1) a non-ionic emulsifier, (2) a water-insoluble copolymer containing, in the polymer molecule, units of at least one ester of an acid selected from the group consisting of acrylic and methacrylic acids and 0.25 to 25 molar percent of carboxyl-containing monomeric units derived from at least one member of the class consisting of acrylic, methacrylic, and itaconic acids, and (3) a basic salt of a polyvalent metal in an amount from 0.125 to 12.5 molar percent based on the weight of the copolymer.

4. A composition as defined in claim 3 in which the basic salt is basic aluminum acetate.

5. As a new composition of matter, an aqueous medium containing dispersed therein (1) a non-ionic emulsifier, (2) a copolymer containing, in the polymer molecule, 75 to 99.75 molar percent of monomeric units derived from at least one member of the class consisting of the alkyl esters of acrylic and methacrylic acids in which the alkyl group of the ester contains one to eight carbon atoms and 0.25 to 25 molar percent of carboxyl-containing monomeric units derived from at least one member of the class consisting of acrylic, methacrylic, and itaconic acids, and (3) a basic salt of a polyvalent metal in an amount from 0.125 to 12.5 molar percent based on the weight of the copolymer.

6. As a new composition of matter, an aqueous medium containing dispersed therein (1) a non-ionic emulsifier, (2) a copolymer containing, in the polymer molecule, 75 to 99.75 molar percent of ethyl acrylate and 0.25 to 25 molar percent of acrylic acid, and (3) 0.125 to 12.5 molar percent, based on the weight of the copolymer, of calcium hydroxide.

7. As a new composition of matter, an aqueous medium containing dispersed therein (1) a non-ionic emulsifier, (2) a copolymer containing, in the polymer molecule, (a) 75 to 99.75 molar percent of a mixture of six moles of ethyl acrylate and four moles of methyl methacrylate, and (b) 0.25 to 25 molar percent of methacrylic acid, and (3) 0.125 to 12.5 molar percent, based on the weight of the copolymer, of basic aluminum acetate.

8. A process for making a dispersion of a resin which comprises incorporating a basic metallic compound in dispersed condition, in an aqueous medium containing dispersed therein (1) a non-ionic emulsifier and (2) a copolymer containing, in the polymer molecule, units of at least one ester of an acid selected from the group consisting of acrylic and methacrylic acids and 0.25 to 25 molar percent of carboxyl-containing monomeric units derived from at least one member of the class consisting of acrylic, methacrylic, and itaconic acids, the basic metallic compound being selected from the class consisting of polyvalent metal salts of weak acids, basic salts of polyvalent metals, the oxides and hydroxides of barium, calcium, magnesium, and strontium, and the hydroxides of aluminum, lead, and zirconium, and being added in an amount from 0.125 to 12.5 molar percent based on the weight of the copolymer.

9. A process for making a dispersion of a resin which comprises incorporating calcium hydroxide in dispersed condition, in an aqueous medium containing dispersed therein (1) a non-ionic emulsifier and (2) a copolymer containing, in the polymer molecule, 75 to 99.75 molar percent of ethyl acrylate and 0.25 to 25 molar percent of acrylic acid, the amount of calcium hydroxide incorporated being from 0.125 to 12.5 molar percent, based on the weight of the copolymer.

10. A process for making a dispersion of a resin which comprises incorporating basic aluminum acetate in dispersed condition, in an aqueous medium containing dispersed therein (1) a non-ionic emulsifier and (2) a copolymer containing, in the polymer molecule, 75 to 99.75 molar percent of ethyl acrylate and 0.25 to 25 molar percent of acrylic acid, the amount of basic aluminum acetate incorporated being from 0.125 to 12.5 molar percent, based on the weight of the copolymer.

11. A process for making a dispersion of a resin which comprises incorporating calcium hydroxide in dispersed condition, in an aqueous medium containing dispersed therein (1) a non-ionic emulsifier and (2) a copolymer containing, in the polymer molecule, (a) 75 to 99.75 molar percent of a mixture of six moles of ethyl acrylate and four moles of methyl methacrylate and (b) 0.25 to 25 molar percent of methacrylic acid, the amount of calcium hydroxide incorporated being from 0.125 to 12.5 molar percent, based on the weight of the copolymer.

12. A process for making a dispersion of a resin which comprises incorporating basic aluminum acetate in dispersed condition, in an aqueous medium containing dispersed therein (1) a non-ionic emulsifier and (2) a copolymer containing, in the polymer molecule, (a) 75 to 99.75 molar percent of a mixture of six moles of ethyl acrylate and four moles of methyl methacrylate and (b) 0.25 to 25 molar percent of methacrylic acid, the amount of basic aluminum acetate incorporated being from 0.125 to 12.5 molar percent, based on the weight of the copolymer.

References Cited in the file of this patent

FOREIGN PATENTS 580,250    Great Britain _____ Dec. 20, 1944